(12) United States Patent
Wakayama

(10) Patent No.: US 9,487,035 B2
(45) Date of Patent: Nov. 8, 2016

(54) PRINTING APPARATUS, CONTROL METHOD, AND NON-TRANSITORY STORAGE MEDIUM

(71) Applicant: CANON KABUSHIKI KAISHA, Tokyo (JP)

(72) Inventor: Naoki Wakayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/994,384

(22) Filed: Jan. 13, 2016

(65) Prior Publication Data

US 2016/0214411 A1    Jul. 28, 2016

(30) Foreign Application Priority Data

Jan. 27, 2015   (JP) ................. 2015-013529

(51) Int. Cl.
| | |
|---|---|
| B41J 11/66 | (2006.01) |
| H04N 1/00 | (2006.01) |
| B41J 11/70 | (2006.01) |
| G06K 15/00 | (2006.01) |
| B41J 11/00 | (2006.01) |

(52) U.S. Cl.
CPC ........... *B41J 11/663* (2013.01); *B41J 11/0065* (2013.01); *B41J 11/703* (2013.01); *G06K 15/4065* (2013.01); *H04N 1/0057* (2013.01); *H04N 1/00676* (2013.01)

(58) Field of Classification Search
CPC ... B41J 11/0065; B41J 11/663; B41J 11/703; H04N 1/0057; H04N 1/00676; G06K 15/4065
See application file for complete search history.

(56) References Cited

U.S. PATENT DOCUMENTS

| | | | | |
|---|---|---|---|---|
| 7,207,639 | B2 * | 4/2007 | Kachi | B41J 11/003 347/14 |
| 7,465,009 | B2 * | 12/2008 | Fujita | B41J 11/0065 347/16 |
| 7,808,679 | B2 * | 10/2010 | Kasuga | G06F 3/1204 358/1.1 |
| 7,819,597 | B2 | 10/2010 | Kohira | |
| 8,534,941 | B2 | 9/2013 | Takayama | |
| 8,659,789 | B2 | 2/2014 | Iwata et al. | |
| 8,757,755 | B2 * | 6/2014 | Hoshi | B41J 2/2142 347/101 |
| 8,783,859 | B2 | 7/2014 | Tokisawa et al. | |
| 8,867,087 | B2 * | 10/2014 | Takagi | H04N 1/32229 358/1.18 |
| 8,950,845 | B2 | 2/2015 | Nagoshi et al. | |
| 2011/0239839 | A1 * | 10/2011 | Yoshida | B26D 1/085 83/79 |
| 2012/0243049 | A1 | 9/2012 | Takayama | |

FOREIGN PATENT DOCUMENTS

| | | |
|---|---|---|
| JP | 2003-112453 A | 4/2003 |
| JP | 3826999 B2 | 9/2006 |
| JP | 2012-196860 A | 10/2012 |
| JP | 2013-159103 A | 8/2013 |

* cited by examiner

*Primary Examiner* — Anh T. N. Vo

(74) *Attorney, Agent, or Firm* — Fitzpatrick, Cella, Harper & Scinto

(57) ABSTRACT

A printing apparatus includes a conveying unit, a printing unit, a cutting unit, and a control unit. In a case in which a marginless image is to be printed, if the margin portion is added on a trailing edge side of an image before the marginless image, the control unit performs control of printing the marginless image next to the margin portion. If the margin portion is not added on the trailing edge side of the image before the marginless image, the control unit performs control of providing a margin portion of more than the predetermined length before the marginless image.

11 Claims, 8 Drawing Sheets

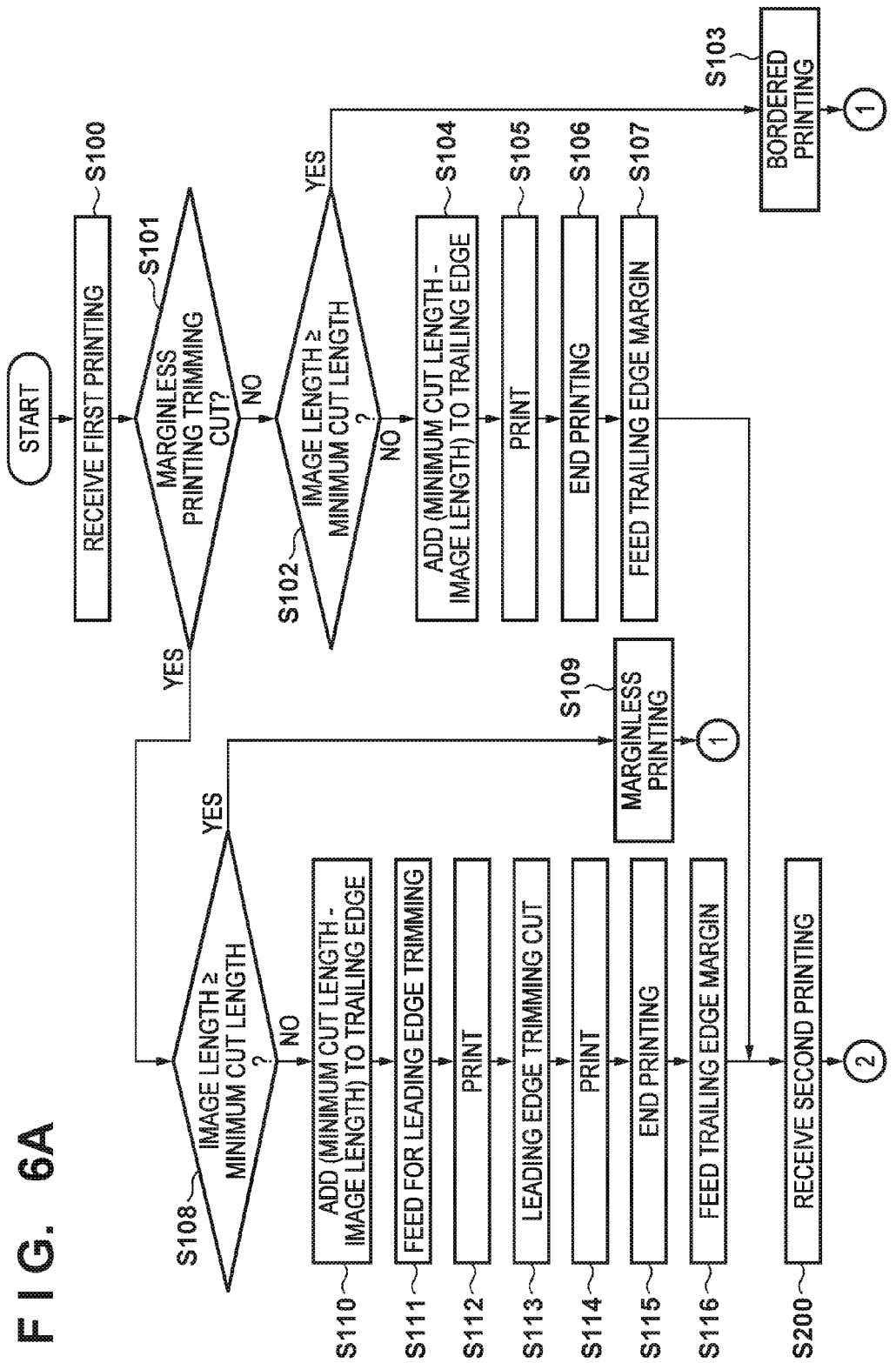

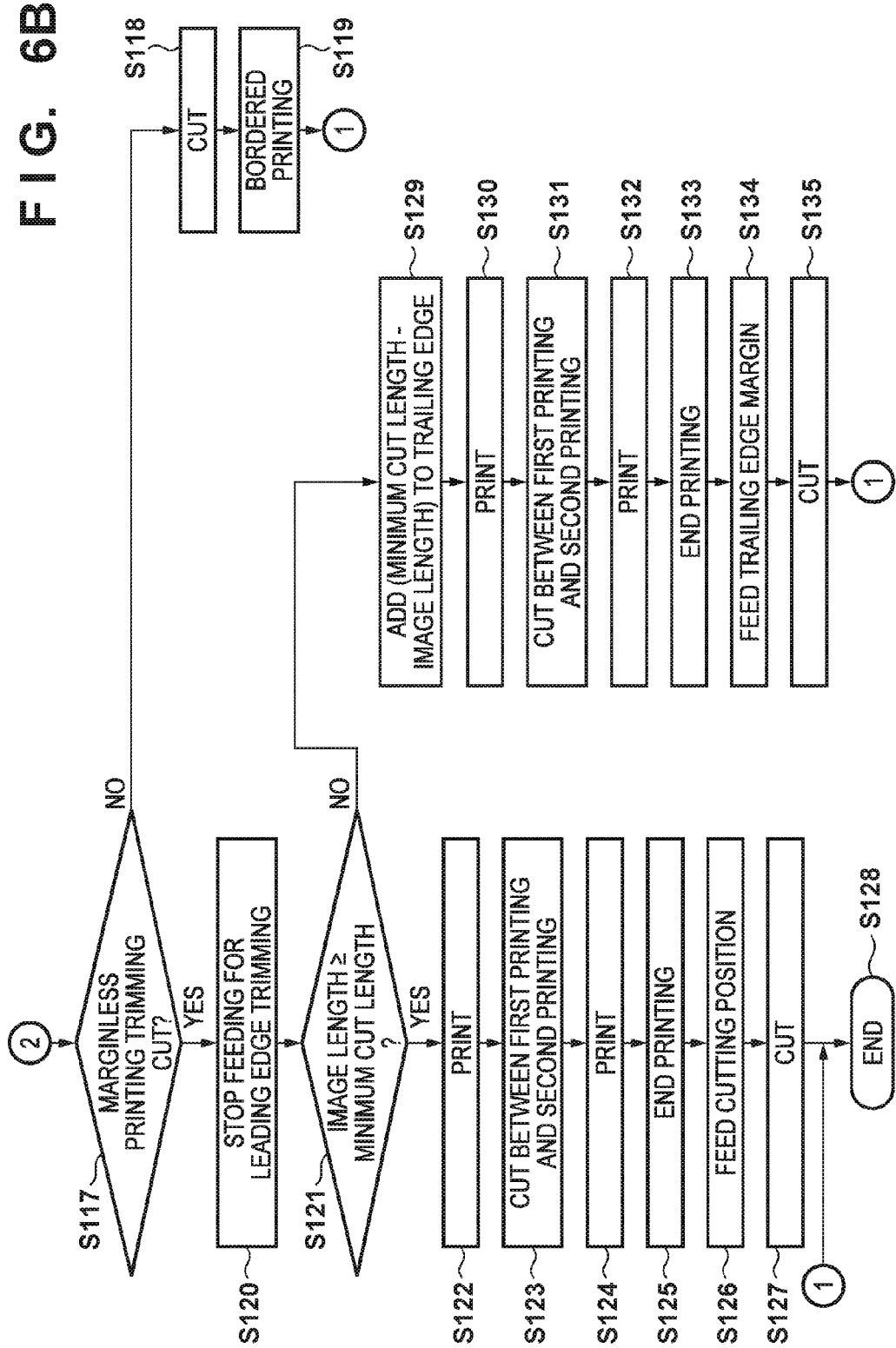

PRINTING APPARATUS, CONTROL METHOD, AND NON-TRANSITORY STORAGE MEDIUM

BACKGROUND OF THE INVENTION

Field of the Invention

The present invention relates to a printing apparatus, a control method of the printing apparatus, and a non-transitory storage medium.

Description of the Related Art

In a printing apparatus such as a printer, a copying machine, or a facsimile apparatus, a printhead prints, for example, an image based on image data on a printing medium supplied from a feeding unit. As the printing medium, rolled continuous sheet, a cut sheet, a plastic sheet, or the like is generally used. In particular, a printing apparatus using a continuous sheet, which handles a printing medium of large size, generally includes a cutting mechanism that cuts the continuous sheet at a predetermined position after printing.

If the continuous sheet cut by the cutting mechanism is extremely short, like a strip, end buckling at the start of cutting or jamming of the strip into the apparatus caused by movement of the cutting mechanism may occur, resulting in incomplete cutting. In addition, if the cut continuous sheet is extremely short, the cut continuous sheet may remain in the printing apparatus without being discharged from the apparatus. To prevent such a cutting failure or discharge failure, the printing apparatus sets a minimum cut length that is a minimum length necessary when cutting the continuous sheet by the cutting mechanism. Japanese Patent No. 3826999 discloses a technique of, when cutting a continuous sheet by a cutting mechanism, adding a margin to an image to forcibly increase the length of the cut continuous sheet to the minimum cut length if an image printed by the printhead is shorter than the minimum cut length.

In recent years, technologies to implement printing without margins on the four sides of a printed product (to be referred to as a "marginless printing" hereinafter) and printing with margins on the four sides of a printed product (to be referred to as a "bordered printing" hereinafter) have been developed. In marginless printing, printing is performed within the range more than the continuous sheet width in the main scanning direction of the printhead, which is the widthwise direction of the continuous sheet, thereby forming a printed image without margins at the two ends of the continuous sheet in the widthwise direction. Additionally, in marginless printing, image printing is started after the continuous sheet is fed in an extra amount in its conveyance direction. As soon as the image printing start position of the continuous sheet reaches the cutting position of the cutting mechanism, the cutting mechanism cuts the portion fed in the extra amount and part of the image.

This makes it possible to form a printed image without a margin at the leading edge of the continuous sheet. Note that the action of cutting the fed portion and the part of the image for marginless printing will be referred to as leading edge trimming cut. In the leading edge trimming cut, the continuous sheet including the fed portion and the part of the image is cut. A setting is done such that the total length of the fed portion and the part of the image of the continuous sheet becomes a leading edge trimming cut length. The leading edge trimming cut length is set to be equal to or more than at least the minimum cut length due to the above-described reason.

In marginless printing, image printing is continuously done on the continuous sheet. When the printing edges are at the trailing edge of the image in the conveyance direction, the printing edge portion is conveyed to the cutting position. The continuous sheet is cut by the cutting mechanism with part of the image left on the continuous sheet. The cut continuous sheet thus changes to a cut sheet, and a printed image without a margin on any of the four sides can be formed. The printing apparatus waits until reception of the next printing instruction in a state in which the part of the image is left on the continuous sheet.

Control of a printing apparatus according to related art will be described here with reference to FIG. 7 assuming a case in which marginless printing in a length shorter than a minimum cut length Lc is performed, and after that, marginless printing in a length longer than the minimum cut length Lc is continuously performed. Note that the positions of broken lines in FIG. 7 indicate a plurality of cutting positions Ca, Cb, Cc, and Cd at which continuous sheet 1 is cut. An arrow Y in FIG. 7 indicates the conveyance direction Y of the continuous sheet 1. The continuous sheet 1 is conveyed from the upstream side on the upper side of FIG. 7 to the downstream side on the lower side. First, upon receiving a marginless printing instruction for a first image 20b of a length Lb shorter than the minimum cut length Lc, the printing apparatus (not shown) adds a first leading edge fed portion 30b for leading edge trimming cut to the leading edge of the continuous sheet 1 in the conveyance direction Y. Next to the first leading edge fed portion 30b, the printing apparatus adds part of the first image 20b to the continuous sheet 1 and then sets the first cutting position Ca. Here, the length from the leading edge to the continuous sheet 1 to the first cutting position Ca becomes at least the minimum cut length Lc.

Since the first image 20b after the first cutting position Ca is shorter than the minimum cut length Lc, the printing apparatus adds a trailing edge margin 32 following the first image 20b to the continuous sheet 1, and sets the second cutting position Cb. The length between the cutting positions Ca and Cb, including the part of the first image 20b and the trailing edge margin 32, thus becomes at least the minimum cut length Lc. Next, upon receiving a marginless printing instruction for a second image 20a of a length La longer than the minimum cut length Lc, the printing apparatus sets the third cutting position Cc. The third cutting position Cc is set after a second leading edge fed portion 30a for leading edge trimming cut and part of the second image 20a are added to the continuous sheet 1 after the second cutting position Cb. The length between the cutting positions Cb and Cc becomes at least the minimum cut length Lc. Since the second image 20a after the third cutting position Cc is longer than the minimum cut length Lc, the printing apparatus adds the rest of the second image 20a to the continuous sheet 1, and sets the fourth cutting position Cd near the trailing edge of the second image 20a.

As described with reference to FIG. 7, when performing marginless printing, the printing apparatus adds the leading edge fed portions 30a and 30b to the continuous sheet 1 to do leading edge trimming cut. The leading edge fed portions 30a and 30b are unnecessary for the user. In addition, when the first image 20b of the length shorter than the minimum cut length Lc is cut into a cut sheet between the cutting positions Ca and Cb, the printed product is discharged while including the first image 20b and the trailing edge margin 32 from the leading edge in the conveyance direction Y.

The printed product of the cut sheet includes the trailing edge margin 32 and does not therefore meet the user's requirement of the final form of the printed product. Hence, the forcibly added trailing edge margin 32 needs to be cut by, for example, post-processing on the user side, and the cut trailing edge margin 32 is unnecessary. In particular, the trailing edge margin 32, with which the printed product is cut into a cut sheet between the cutting positions Ca and Cb obtains the minimum cut length Lc, and the second leading edge fed portion 30a for leading edge trimming cut of the second image 20a are discharged without being used for printing. Hence, plain portions unnecessary for the user are individually continuously generated, wastefully consuming the continuous sheet 1.

SUMMARY OF THE INVENTION

The present invention provides a technique of reducing wasteful consumption of a continuous sheet.

According to an aspect of the present invention, there is provided a printing apparatus comprising: a conveying unit configured to convey a continuous sheet in a conveyance direction; a printing unit configured to print an image on the continuous sheet; a cutting unit configured to cut the continuous sheet at a location of a leading edge side and a trailing edge side of the image printed on the continuous sheet; and a control unit configured to, when an image whose length in the conveyance direction is less than a predetermined length is printed, perform control of adding a margin portion on the trailing edge side of the image such that a length from a cutting position on the leading edge side of the image to a cutting position on the trailing edge side becomes more than the predetermined length, wherein in a case in which a marginless image is to be printed, if the margin portion is added on the trailing edge side of an image before the marginless image, the control unit performs control of printing the marginless image next to the margin portion, and if the margin portion is not added on the trailing edge side of the image before the marginless image, the control unit performs control of providing a margin portion of more than the predetermined length before the marginless image.

According to still another aspect of the present invention, there is provided a control method of a printing apparatus including: a conveying unit configured to convey a continuous sheet in a conveyance direction; a printing unit configured to print an image on the continuous sheet; a cutting unit configured to cut the continuous sheet at a location of a leading edge side and a trailing edge side of the image printed on the continuous sheet; and a control unit configured to, when an image whose length in the conveyance direction is less than a predetermined length is printed, perform control of adding a margin portion on the trailing edge side of the image such that a length from a cutting position on the leading edge side of the image to a cutting position on the trailing edge side becomes more than the predetermined length, the method comprising: in a case in which a marginless image is to be printed, if the margin portion is added on the trailing edge side of an image before the marginless image, causing the control unit to print the marginless image next to the margin portion; and if the margin portion is not added on the trailing edge side of the image before the marginless image, causing the control unit to provide a margin portion of more than the predetermined length before the marginless image.

According to still another aspect of the present invention, there is provided a non-transitory storage medium storing a program for causing a computer of a printing apparatus including: a conveying unit configured to convey a continuous sheet in a conveyance direction; a printing unit configured to print an image on the continuous sheet; a cutting unit configured to cut the continuous sheet at a location of a leading edge side and a trailing edge side of the image printed on the continuous sheet; and a control unit configured to, when an image whose length in the conveyance direction is less than a predetermined length is printed, perform control of adding a margin portion on the trailing edge side of the image such that a length from a cutting position on the leading edge side of the image to a cutting position on the trailing edge side becomes more than the predetermined length, the program comprising: in a case in which a marginless image is to be printed, if the margin portion is added on the trailing edge side of an image before the marginless image, causing the control unit to print the marginless image next to the margin portion; and if the margin portion is not added on the trailing edge side of the image before the marginless image, causing the control unit to provide a margin portion of more than the predetermined length before the marginless image.

Further features of the present invention will become apparent from the following description of exemplary embodiments (with reference to the attached drawings).

BRIEF DESCRIPTION OF THE DRAWINGS

FIG. 6A and FIG. 6B are flowcharts of the embodiment of the present invention.

DESCRIPTION OF THE EMBODIMENTS

Figure 1:
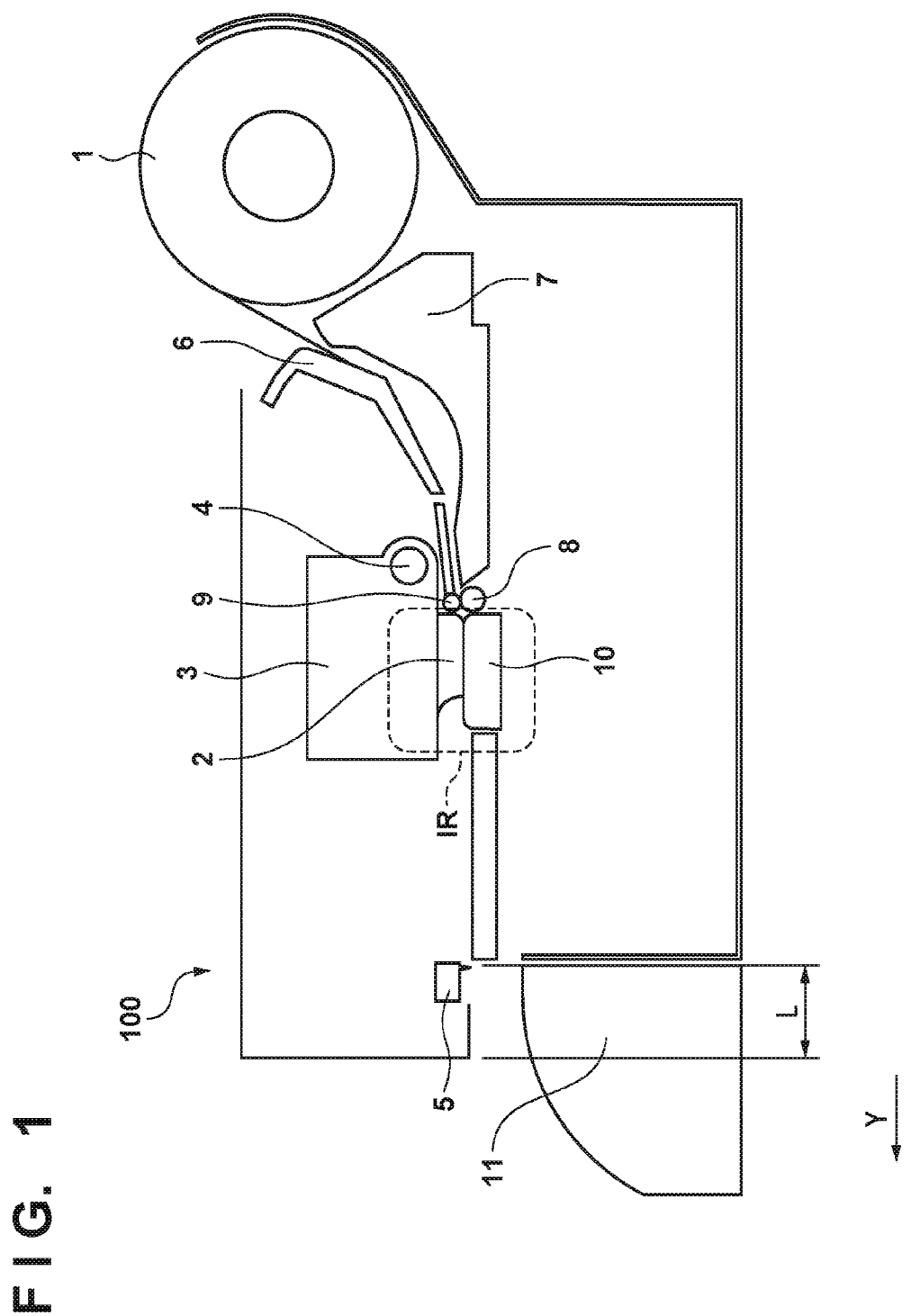
FIG. 1 is a schematic sectional view showing an inkjet printing apparatus according to an embodiment of the present invention.

An embodiment of the present invention will now be described in accordance with the accompanying drawings. Note that the same reference numerals denote the same or corresponding parts throughout the drawings. In the following explanation, the upward/downward and leftward/rightward directions of a drawing are used as the upward/downward and leftward/rightward directions of an inkjet printing apparatus 100 or continuous sheet 1 (to be described later) for the description. "Image" broadly includes information formed on a printing medium, for example, information such as characters and graphics, and figures, patterns, and the like including these pieces of information regardless of whether they are significant or insignificant and whether they are so visualized as to be visually perceivable by humans.

"Printing" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans. In this embodiment, "printing medium" is assumed to be a rolled continuous sheet, but it may be a sheet or cloth, a plastic film, or the like. "Ink" (to be also referred to as a "liquid") should be extensively interpreted similar to the definition of "print" described above. That is, "ink" represents a liquid which, when applied onto a printing medium, can form images, figures, patterns, and the like, can process the printing medium, and can process ink (for example, solidifying or insolubilizing a coloring agent contained in ink applied to the printing medium).

<Inkjet Printing Apparatus 100>

The schematic arrangement of an inkjet printing apparatus 100 according to the embodiment of the present invention will be described with reference to FIG. 1. FIG. 1 is a schematic sectional view of the inkjet printing apparatus 100. Referring to FIG. 1, the direction indicated by an arrow Y is the conveyance direction Y in which continuous sheet 1 to be described later is conveyed. The right side in FIG. 1 will be referred to as an upstream side, and the left side as a downstream side and used in the following explanation. The inkjet printing apparatus 100 includes the continuous sheet 1 as a printing medium, a printhead unit 2, a carriage 3, a carriage shaft 4, a cutter 5 serving as a cutting unit, an upper guide 6, a lower guide 7, a conveyance roller 8, a pinch roller 9, a platen 10, and a discharge guide 11.

The rolled continuous sheet 1 is arranged on the right side of the inkjet printing apparatus 100 in FIG. 1. The continuous sheet 1 held on the inkjet printing apparatus 100 is fed to the downstream side via a continuous sheet conveyance path formed from the upper guide 6 and the lower guide 7. When the leading edge of the continuous sheet 1 reaches the nip portion between the conveyance roller 8 and the pinch roller 9, the continuous sheet 1 is nipped by the conveyance roller 8 and the pinch roller 9, which serve as a conveying unit, and conveyed onto the platen 10 facing the printhead unit 2. The printhead unit 2, the carriage 3 on which the printhead unit 2 is mounted, and the platen 10 facing the printhead unit 2 construct an image printing unit IR. The printhead unit 2 discharges ink to the continuous sheet 1 conveyed to the image printing unit IR to print an image.

The carriage 3 is slidably supported along the carriage shaft 4 and a guide rail (not shown), which are arranged in parallel to each other in the inkjet printing apparatus 100. The moving direction of the carriage 3 is a direction perpendicular to the conveyance direction Y of the continuous sheet 1. This direction will be referred to as a main scanning direction. Note that the conveyance direction Y will be referred to as a sub-scanning direction. In the image printing unit IR, when the carriage 3 moves forward or backward to scan one line, and an image is thus formed on the continuous sheet 1, the conveyance roller 8 and the pinch roller 9 feed the continuous sheet 1 in the conveyance direction Y by a predetermined pitch. After that, the image printing unit IR moves the carriage 3 again to print the image of the next line. The entire image is printed by repeating this operation. A printed portion of the continuous sheet 1 is conveyed to the discharge guide 11. When image printing edges, the continuous sheet 1 is conveyed to a predetermined cutting position at which the cutter 5 is arranged, and cut by the cutter 5 in a direction crossing the conveyance direction Y.

The cut continuous sheet 1 is discharged from the discharge guide 11 to the outside of the inkjet printing apparatus 100. The distance from the cutter 5 as the cutting position of the continuous sheet 1 to the outer periphery of the housing of the inkjet printing apparatus 100 is defined as a distance L. In this case, if the continuous sheet 1 to be cut is considerably shorter than the distance L, the continuous sheet 1 after cutting readily remains at the position, and it is difficult for the user to externally remove the sheet. In addition, when cutting the continuous sheet 1 into a considerably short strip shape, the continuous sheet 1 is easily moved by an external factor such as a cutting operation or next printing operation, and an unexpected operation failure may occur in the inkjet printing apparatus 100. Hence, for example, the distance L is set to a minimum cut length Lc that allows the cut continuous sheet to be discharged or allows the continuous sheet to be cut. If the length of a printed image is shorter than the minimum cut length Lc, a margin (margin portion) needs to be added to make the length longer than the minimum cut length Lc. The minimum cut length Lc can be, for example, 100 to 200 mm. However, the minimum cut length is not limited to this, and may have another value depending on the arrangement of the printing apparatus 100.

<Control Arrangement>

Figure 2:
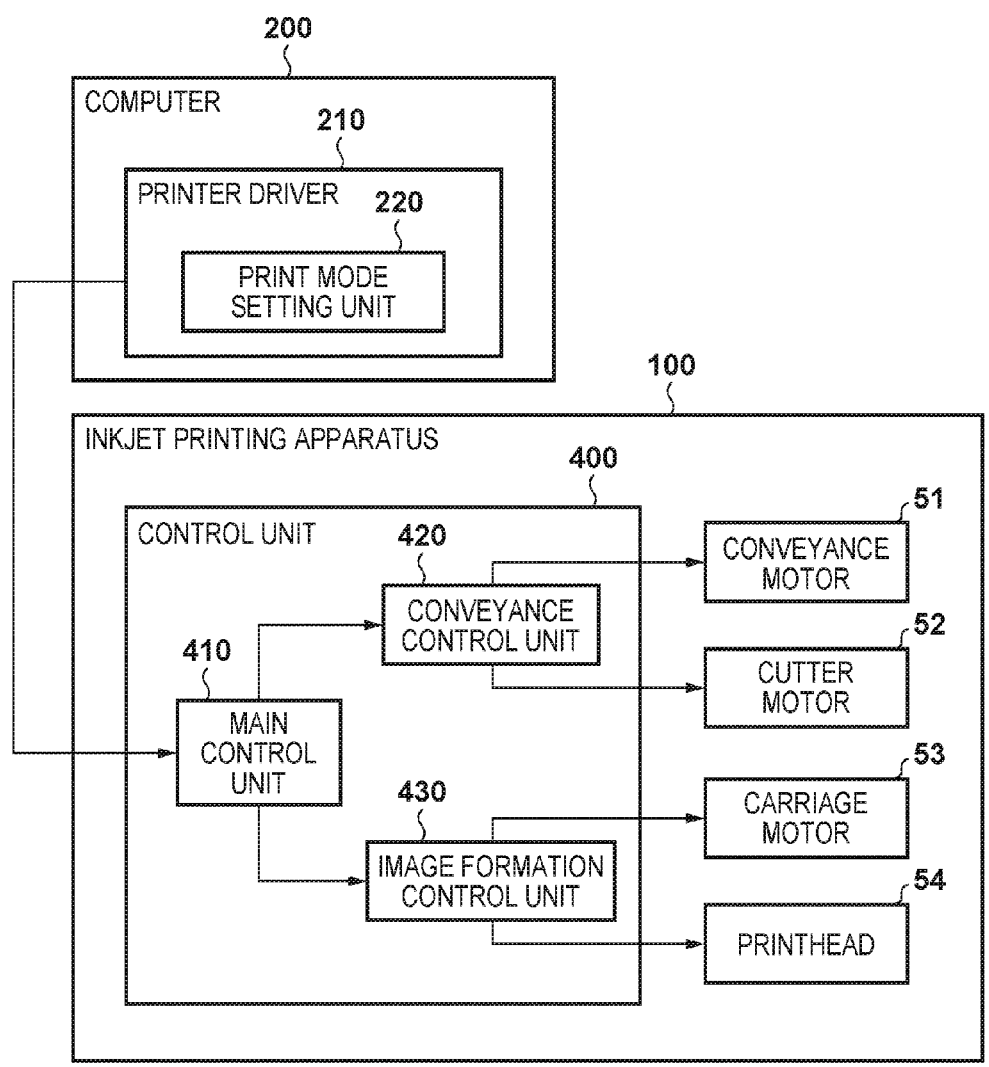
FIG. 2 is a block diagram showing a control arrangement according to the embodiment of the present invention.

A schematic block diagram showing a control arrangement according to the embodiment of the present invention will be described next with reference to FIG. 2. The inkjet printing apparatus 100 is connected to a computer 200 as an external apparatus via an interface (not shown). A printer driver 210 stored in a storage unit is constituted on the computer 200. In this embodiment, at least a print mode setting unit 220 is provided as a function of the printer driver 210. In the print mode setting unit 220, marginless printing and bordered printing can be selected by the user.

A control unit 400 is constituted on the inkjet printing apparatus 100. The control unit 400 controls a conveyance motor 51, a cutter motor 52, a carriage motor 53, and a printhead 54. The control unit 400 includes a main control unit 410, a conveyance control unit 420, and an image formation control unit 430, including a CPU, a ROM, a RAM, and a motor driver (none are shown). The main control unit 410 determines whether an image length received from the printer driver 210 is long or short with respect to the minimum cut length Lc, and gives instructions to the conveyance control unit 420 and the image formation control unit 430. Hence, the main control unit 410 serves as a determination unit that prepares a plurality of controls (minimum cut control that is first control and trimming cut control that is second control) to be described later, makes them executable, and determines application of the controls.

Based on the instruction from the main control unit 410, the conveyance control unit 420 drives the conveyance motor 51 to feed the sheet such that a length equal to or more than the minimum cut length Lc is obtained, and drives the cutter motor 52 to cut the continuous sheet 1. Based on the instruction from the main control unit 410, the image formation control unit 430 cooperatively drives the carriage motor 53 and the printhead 54 to form an image at a predetermined position on the continuous sheet 1. Note that in this embodiment, the main control unit 410 determines whether an image length is long or short with respect to the minimum cut length Lc. However, the determination may be done with respect to a minimum image length stored in the printer driver 210. At this time, the main control unit 410 determines whether an image length is long or short with respect to the minimum image length stored in the printer driver 210.

<Control of Inkjet Printing Apparatus 100>

Figure 3:
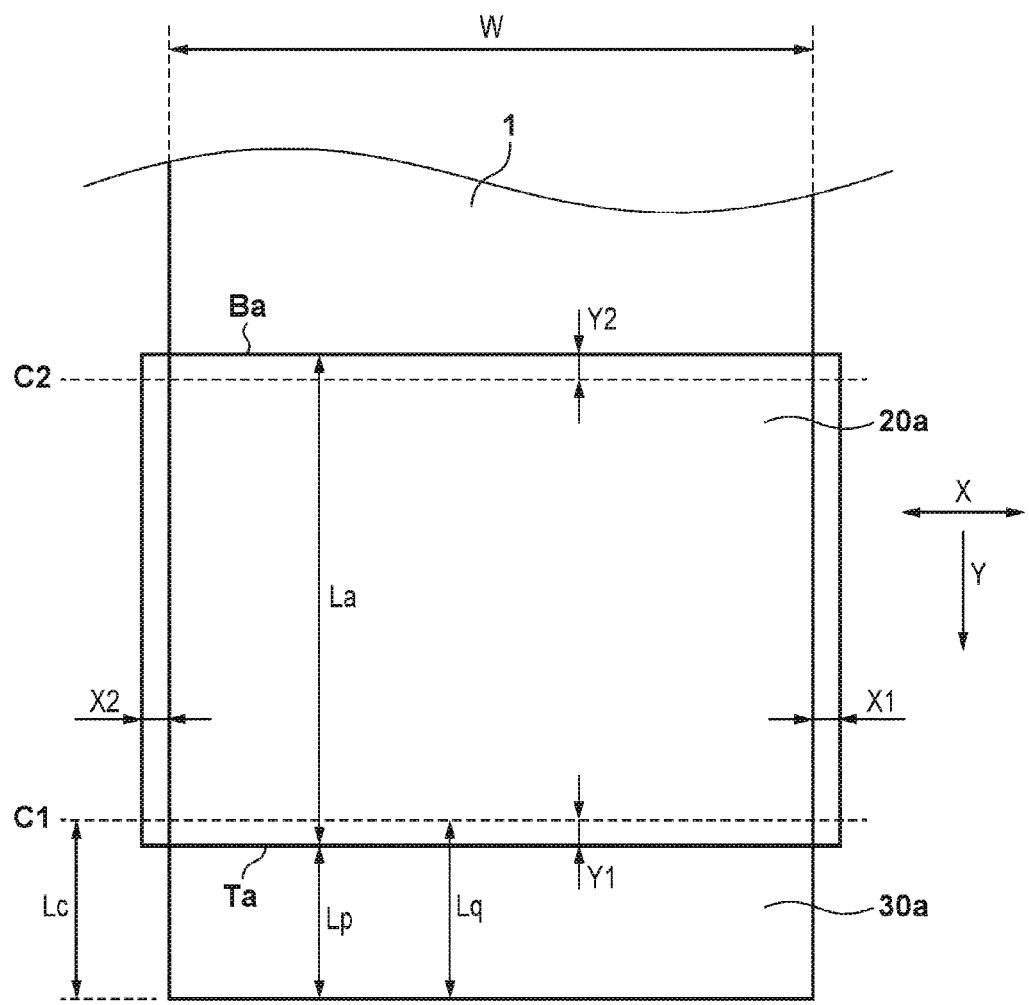
FIG. 3 is an explanatory view showing a print state of marginless printing in which an image has a length equal to or more than the minimum cut length.
Figure 4:
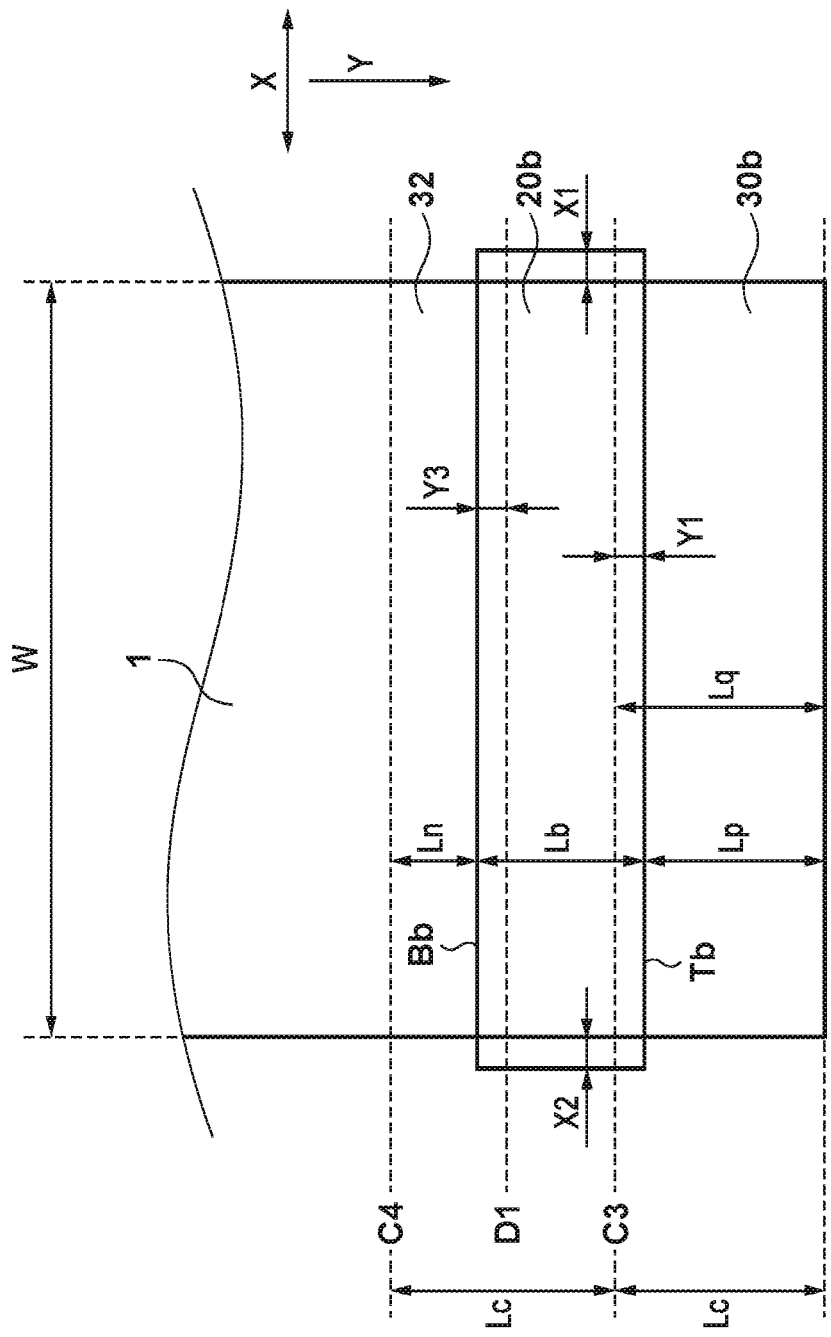
FIG. 4 is an explanatory view showing a print state of marginless printing in which an image has a length shorter than the minimum cut length.
Figure 5:
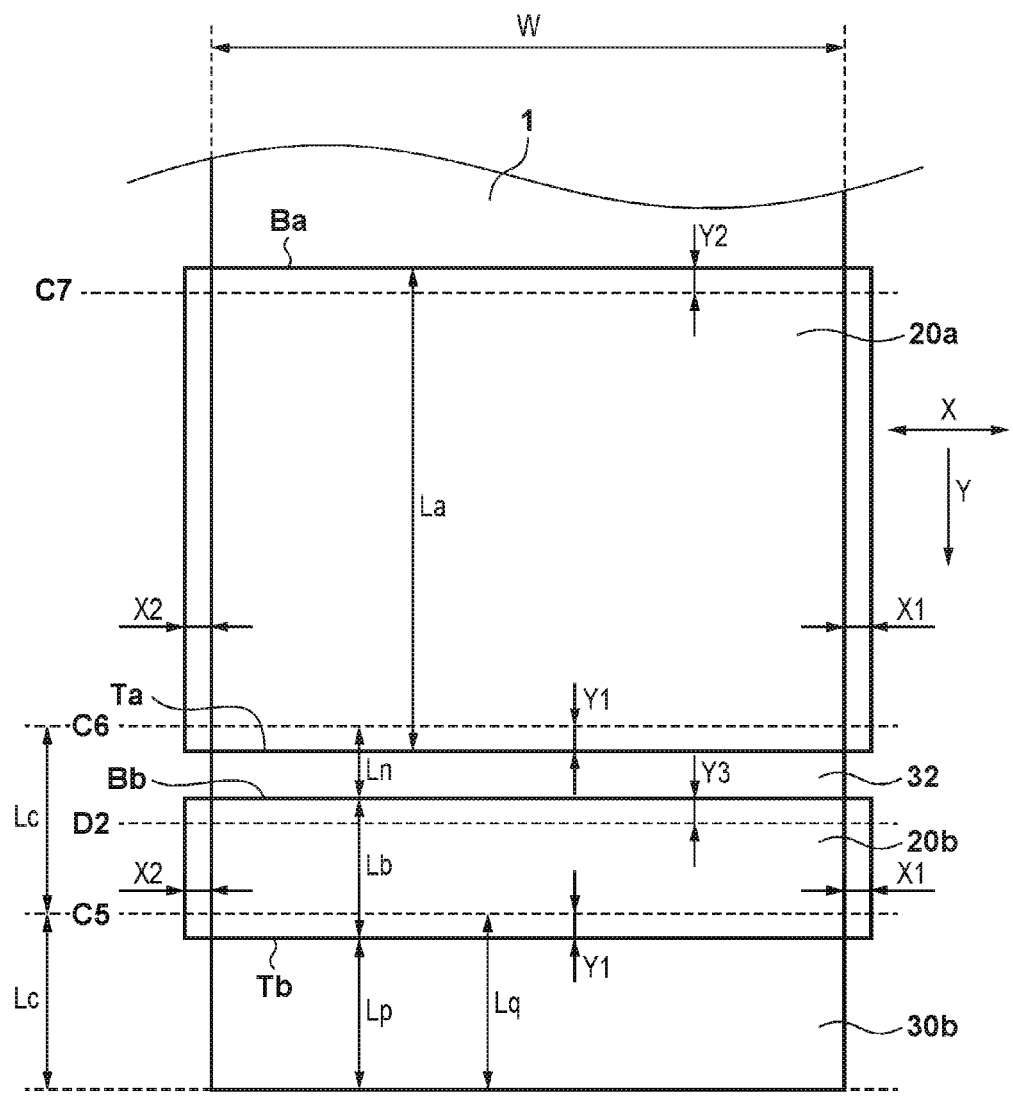
FIG. 5 is an explanatory view showing a print state according to the embodiment of the present invention.
Figure 7:
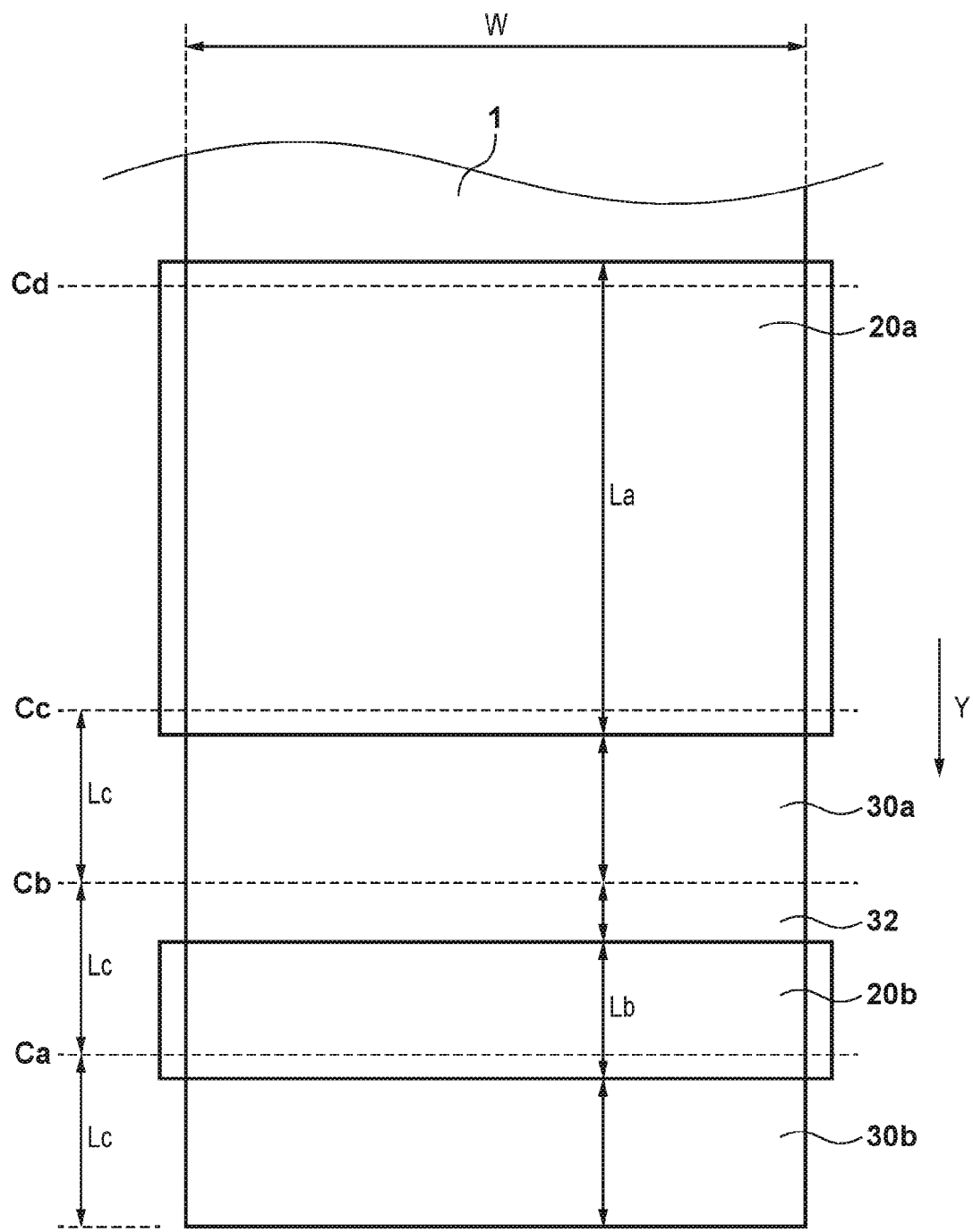
FIG. 7 is an explanatory view showing an example of a print state according to related art.

A print control method of the inkjet printing apparatus 100 for the continuous sheet 1 will be described next with reference to FIGS. 3 to 6. FIG. 3 is an explanatory view showing a print state of marginless printing in which an image has a length equal to or more than the minimum cut length Lc. FIG. 4 is an explanatory view showing a print state of marginless printing in which an image has a length shorter than the minimum cut length Lc. FIG. 5 is an explanatory view showing a print state according to the embodiment of the present invention. FIGS. 6A and 6B are flowcharts of the embodiment. The positions of broken lines in FIGS. 3 to 5 indicate cutting positions.

A case in which marginless printing is executed using an image length equal to or more than the minimum cut length Lc will be described with reference to FIG. 3. In FIG. 3, an arrow X indicates the main scanning direction X of the printhead unit 2, and an arrow Y indicates the conveyance direction Y of the continuous sheet 1. The downstream side (the lower side in FIG. 3) of an image 20a in the conveyance direction Y is defined as an image leading edge Ta, and the upstream side (the upper side in FIG. 3) is defined as an image trailing edge Ba.

First, upon receiving a marginless printing instruction for the image 20a from the printer driver 210, the inkjet printing apparatus 100 determines whether an image length La of the image 20a is shorter than the minimum cut length Lc. If it is revealed by the determination that the image length La is equal to or more than the minimum cut length Lc, a leading edge fed portion 30a necessary for the above-described leading edge trimming cut is added to the image leading edge Ta of the image 20a, and a cutting position C1 for the leading edge trimming cut is set. As the image 20a is printed on the continuous sheet 1 (to be described later), the continuous sheet 1 is cut at the cutting position C1. That is, when executing marginless printing, the inkjet printing apparatus 100 operates the conveying unit to convey the continuous sheet 1 before printing of the image 20a. The inkjet printing apparatus 100 adds the leading edge fed portion 30a serving as a margin to the leading edge of the image 20a in the conveyance direction Y and prints the image 20a (trimming cut control that is second control). In addition, the inkjet printing apparatus 100 cuts the continuous sheet 1 including the leading edge fed portion 30a and part of the leading edge of the image 20a.

The length of the leading edge fed portion 30a is defined as a leading edge fed portion length Lp, and the length cut by leading edge trimming cut is defined as a leading edge trimming cut length Lq. Note that the leading edge trimming cut length Lq is the sum of the leading edge fed portion length Lp and a step-in length Y1 from the cutting position C1 of the image leading edge Ta. Here, Lq=(Lp+Y1)≥Lc holds. That is, the leading edge trimming cut length Lq cut by leading edge trimming cut is also restricted by the above-described minimum cut length Lc. This is because if any one of the lengths cut from the continuous sheet 1 by the cutter 5 is shorter than the minimum cut length Lc, a discharge failure or operation failure occurs. Note that the step-in length Y1 can be about 3 mm.

After the printing operation of the image 20a on the continuous sheet 1, a cutting position C2 at which the cutter 5 cuts the continuous sheet 1 is set at a position corresponding to the image length La. The cutting position C2 is set at a position moved from the image trailing edge Ba of the image 20a to the downstream side by a distance indicated by a step-in length Y2. When the control operation is determined in this way, the continuous sheet 1 is conveyed by a predetermined amount in the conveyance direction Y, and printing of the image leading edge Ta of the image 20a starts from a position moved from the cutting position C1 to the downstream side by a distance indicated by the step-in length Y1.

Next, when printing on the continuous sheet 1 in the main scanning direction X, the printhead unit 2 discharges ink up to a position moved rightward from the right edge of the continuous sheet 1 shown in FIG. 3 by a distance indicated by an extra-printing width X1, and discharges ink up to a position moved leftward from the left edge of the continuous sheet 1 shown in FIG. 3 by a distance indicated by an extra-printing width X2. That is, the printhead unit 2 discharges ink within the range more than a width W of the continuous sheet 1 at the time of main scanning, thereby forming an image without margins concerning the right and left edges of the continuous sheet 1. Note that the extra-printing widths X1 and X2 can be about 3 mm. The platen 10 of the inkjet printing apparatus 100 may be provided with a structure capable of receiving ink to cope with the ink discharge within the range more than the width W of the continuous sheet 1.

When printing of the image 20a progresses, and the cutting position C1 is conveyed to the attachment position of the cutter 5, the continuous sheet 1 is cut at the position. Since the leading edge fed portion 30a added for the leading edge trimming cut is cut while including the step-in length Y1 of the leading edge of the image 20a, a printed image without a margin at the leading edge can be formed on the continuous sheet 1. Printing of the image 20a further progresses, and printing of the image trailing edge Ba of the image 20a edges at a position moved from the cutting position C2 to the upstream side by a distance indicated by the step-in length Y2.

When printing of the image 20a edges, the cutting position C2 of the continuous sheet 1 is conveyed up to the cutter 5 in the conveyance direction Y. When the cutting position C2 reaches the attachment position of the cutter 5, the continuous sheet 1 is cut at the position. An image without a margin at the trailing edge of the image 20a can thus be formed. Note that the step-in length Y2 can be about 3 mm. The numerical values of Y1, Y2, X1, and X2 are merely examples and are not limited to those described above. With the above-described operation, a printed product without a margin on any of the four sides can be obtained.

A case in which marginless printing is executed using an image length shorter than the minimum cut length Lc will be described next with reference to FIG. 4. The downstream side (the lower side in FIG. 4) of an image 20b in the conveyance direction Y is defined as an image leading edge Tb, and the upstream side (the upper side in FIG. 4) is defined as an image trailing edge Bb. As described above, upon receiving a marginless printing instruction for the image 20b from the printer driver 210, the inkjet printing apparatus 100 determines whether an image length Lb of the image 20b is shorter than the minimum cut length Lc. First, since the marginless printing instruction is received, a leading edge fed portion 30b necessary for the leading edge trimming cut is added to the image leading edge Tb of the image 20b, and a cutting position C3 for the leading edge trimming cut is set.

If it is revealed by the determination that the image length Lb is shorter than the minimum cut length Lc, it is decided to add a trailing edge margin 32 to the image trailing edge Bb of the image 20b. The length of the trailing edge margin 32 added to the image trailing edge Bb is defined as a trailing edge margin length Ln. Note that the trailing edge margin 32 is manually cut by the user after the sheet is discharged to the outside of the inkjet printing apparatus 100 after the end of printing. Subsequently, a cutting position C4 at which the cutter 5 cuts the continuous sheet 1 after the printing operation is set at the position of the upstream-side end of the trailing edge margin 32. As the image 20b is printed on the continuous sheet 1 (to be described later), the continuous sheet 1 is cut at the cutting position C4. That is, when the image 20b has a length shorter than the minimum cut length Lc that is a predetermined image length in the conveyance direction Y, the inkjet printing apparatus 100 operates the conveying unit to convey the continuous sheet 1. After adding the trailing edge margin 32 to at least the trailing edge of the image 20b in the conveyance direction Y, the inkjet printing apparatus 100 cuts the continuous sheet 1 on the trailing edge side of the trailing edge margin (minimum cut control that is first control). Note that in this embodiment, the cutting position C4 is set at a position moved from the leading edge of the continuous sheet 1 to the upstream side by (Lp+Lb+Ln).

When the control operation is determined in this way, the continuous sheet 1 is conveyed by a predetermined amount in the conveyance direction Y, and printing of the image leading edge Tb of the image 20b starts from a position moved from the cutting position C3 to the downstream side by a distance indicated by the step-in length Y1. Here, Lq=(Lp+Y1)≥Lc holds. Next, when printing on the continuous sheet 1 in the main scanning direction X, the printhead unit 2 discharges ink up to a position moved rightward from the right edge of the continuous sheet 1 shown in FIG. 4 by a distance indicated by the extra-printing width X1, and discharges ink up to a position moved leftward from the left edge of the continuous sheet 1 shown in FIG. 4 by a distance indicated by the extra-printing width X2. That is, the printhead unit 2 discharges ink within the range more than the width W of the continuous sheet 1 at the time of main scanning, thereby forming an image without margins concerning the right and left edges of the continuous sheet 1.

When printing of the image 20b progresses, and the cutting position C3 is conveyed to the attachment position of the cutter 5, the continuous sheet 1 is cut at the position. Since the leading edge fed portion 30b added for the leading edge trimming cut is cut while including the step-in length Y1 of the leading edge of the image 20b, a printed image without a margin at the leading edge can be formed on the continuous sheet 1. When printing of the image 20b ends, the continuous sheet 1 is conveyed in the conveyance direction Y to make the cutting position C4 reach the attachment position of the cutter 5, and the continuous sheet 1 is cut at the position.

A resultant printed product includes the trailing edge margin 32 in the image 20b, and has the length (Lb+Ln−Y1). Note that the length of the printed product meets (Lb+Ln−Y1)≥Lc. After that, to obtain a printed product without a margin on any of the four sides, the trailing edge margin 32 including part of the image is cut by user processing at a cutting position D1 arranged at a position moved from the image trailing edge Bb of the image 20b to the image side by a distance indicated by a step-in length Y3. The step-in length Y3 can be about 3 mm but may arbitrarily be set by the user within the range in which no margin is left on the final product. In addition, since part of the image is not left on the continuous sheet 1 in the printing operation up to this time, processing as a preparation to the next printing is unnecessary. With the above-described operation, a printed product without a margin on any of the four sides can be obtained in the case of the image shorter than the minimum cut length Lc. Note that the numerical value of Y3 is merely an example, and may be another value depending on the arrangement of the printing apparatus.

An operation according to the embodiment of the present invention will be described next with reference to FIG. 5 by exemplifying a case in which after marginless printing in a length shorter than the minimum cut length Lc, marginless printing in a length longer than the minimum cut length Lc is continuously performed. First, upon receiving a marginless printing instruction for the first image (image) 20b from the printer driver 210, the inkjet printing apparatus 100 determines whether the image length Lb of the first image 20b is shorter than the minimum cut length Lc, as described above. The leading edge fed portion 30b necessary for the leading edge trimming cut is added to the image leading edge Tb of the first image 20b, and a cutting position C5 is set.

If it is revealed by the determination that the image length Lb of the first image 20b is shorter than the minimum cut length Lc, it is decided to add the trailing edge margin 32 to the image trailing edge Bb of the first image 20b. At this time, to cause the cutter 5 to cut the continuous sheet 1 after the printing operation, a cutting position C6 on the trailing edge side of the trailing edge margin 32 added to the trailing edge of the first image 20b is set at the position of the upstream-side edge of the trailing edge margin 32. Note that in this embodiment, the cutting position C6 is set at a position moved from the leading edge of the continuous sheet 1 to the upstream side (the upper side of FIG. 5) by (Lp+Lb+Ln).

When the control operation is determined in this way, the continuous sheet 1 is conveyed by a predetermined amount in the conveyance direction Y, and printing of the image leading edge Tb of the first image 20b starts from a position moved from the cutting position C5 to the downstream side by a distance indicated by the step-in length Y1. Here, Lq=(Lp+Y1)≥Lc holds. The printhead unit 2 discharges ink up to a position moved rightward from the right edge of the continuous sheet 1 shown in FIG. 5 by a distance indicated by the extra-printing width X1, and discharges ink up to a position moved leftward from the left edge of the continuous sheet 1 shown in FIG. 5 by a distance indicated by the extra-printing width X2. That is, the printhead unit 2 discharges ink within the range more than the width W of the continuous sheet 1 at the time of main scanning, thereby forming an image without margins concerning the right and left edges of the continuous sheet 1.

When printing of the first image 20b progresses, and the cutting position C5 is conveyed to the attachment position of the cutter 5, the continuous sheet 1 is cut at the position. Since leading edge fed portion 30b added for the leading edge trimming cut is cut while including the step-in length Y1 of the leading edge of the first image 20b, a printed image without a margin at the leading edge can be formed on the continuous sheet 1.

When printing of the first image 20b edges, the continuous sheet 1 is conveyed in the conveyance direction Y by a predetermined amount, and the trailing edge margin 32 is added to the image trailing edge Bb of the first image 20b. Upon receiving a marginless printing instruction for the second image 20a (marginless image) from the printer driver 210, the inkjet printing apparatus 100 determines whether the image length La of the second image 20a is shorter than the minimum cut length Lc. If it is revealed by the determination that the image length La is equal to or more than the minimum cut length Lc, and it is also revealed that the image length Lb of the first image 20b of the preceding printing instruction is shorter than the minimum cut length Lc, addition of the leading edge fed portion 30a when executing marginless printing is stopped. That is, application of trimming cut control (second control) to the second image 20a is prohibited, and setting is done such that the second image 20a is printed next to the trailing edge margin 32 of the first image 20b before the continuous sheet 1 is cut at the cutting position C6 under the minimum cut control (first control). In addition, a cutting position C7 at which the cutter 5 cuts the continuous sheet 1 after the end of the printing operation is set in correspondence with the image length La. The cutting position C7 is set at a position moved from the image trailing edge Ba of the second image 20a to the downstream side by a distance indicated by the step-in length Y2. Note that in this embodiment, a case in which the length of the second image 20a is equal to or more than the minimum cut length Lc has been described. In a case in which the length of the second image 20a is shorter than the minimum cut length Lc as well, addition of the leading edge fed portion 30a may be stopped, as described above.

When the control operation of the second image 20a is determined in this way, printing of the second image 20a starts before execution of the cutting operation at the cutting position C6. Instead of adding the above-described leading edge fed portion 30a, the second image 20a is printed on an upstream-side part of the trailing edge margin 32 of the first image 20b. That is, printing of the image leading edge Ta of the second image 20a starts from a position moved from the cutting position C6 to the downstream side by a distance indicated by the step-in length Y1 such that the second image 20a enters into the trailing edge margin 32 added to the image trailing edge Bb of the first image 20b.

Next, when printing on the continuous sheet 1 in the main scanning direction X, the printhead unit 2 discharges ink up to a position moved rightward from the right edge of the continuous sheet 1 shown in FIG. 5 by a distance indicated by the extra-printing width X1, and discharges ink up to a position moved leftward from the left edge of the continuous sheet 1 shown in FIG. 5 by a distance indicated by the extra-printing width X2. That is, the printhead unit 2 discharges ink within the range more than the width W of the continuous sheet 1 at the time of main scanning, thereby forming an image without margins concerning the right and left edges of the continuous sheet 1.

When printing of the second image 20a progresses, and the cutting position C6 is conveyed to the attachment position of the cutter 5, the continuous sheet 1 is cut at the position. Accordingly, the printed product obtained by the printing instruction of the first image 20b includes the trailing edge margin 32 and the step-in length Y1 of the leading edge of the second image 20a. The printed product has a length (Lb+Ln−Y1) which meets (Lb+Ln−Y1)≥Lc. After that, to obtain a printed product without a margin on any of the four sides, the trailing edge margin 32 including part of the image is cut by user processing at a cutting position D2 arranged at a position moved from the image trailing edge Bb of the first image 20b to the image side by a distance indicated by the step-in length Y3. In addition, since the step-in length Y1 of the leading edge of the second image 20a has already been cut, a printed image without a margin at the leading edge can be formed on the continuous sheet 1.

Printing of the second image 20a on the continuous sheet 1 further progresses, and printing of the image trailing edge Ba of the second image 20a ends at a position moved from the cutting position C7 to the upstream side by a distance indicated by the step-in length Y2. When printing ends, the cutting position C7 of the continuous sheet 1 is conveyed up to the cutter 5 in the conveyance direction Y. When the cutting position C7 reaches the attachment position of the cutter 5, the continuous sheet 1 is cut at the position. Since the trailing edge of the second image 20a is cut at a position moved from the image trailing edge Ba to the downstream side by a distance indicated by the step-in length Y2, an image without a margin at the trailing edge of the second image 20a can be formed.

The inkjet printing apparatus 100 waits until reception of the next printing instruction in a state in which the portion of the step-in length Y2, which is part of the second image 20a, is left on the continuous sheet 1. If the next printing instruction is a marginless printing instruction, a leading edge fed portion for leading edge trimming cut is added for the next printing, and leading edge trimming cut is executed. Accordingly, the portion of the step-in length Y2, which is part of the second image 20a, is cut while being included in the leading edge fed portion for leading edge trimming cut, which is unnecessary for the user.

If the next printing instruction is a bordered printing instruction, the portion of the step-in length Y2 is further fed ahead of the cutter 5. After that, the portion is cut by the cutter 5 at a predetermined position together with the fed portion of the continuous sheet 1. That is, the portion cut at this time is formed from the portion of the step-in length Y2 left on the continuous sheet 1 and the further fed portion of the continuous sheet 1. The total length is set to be equal to or more than at least the minimum cut length Lc, as described above. After that, an appropriate printing operation of bordered printing of the next printing instruction is started.

As described above, in this embodiment, the resultant printed products are the first image 20b including the trailing edge margin 32 and the step-in length Y1 of the leading edge of the second image 20a, and the second image 20a without a margin on any of the four sides. To obtain a printed product without a margin on any of the four sides from the first image 20b, the trailing edge margin is cut by user processing at the cutting position D2 arranged at a position moved from the image trailing edge Bb of the first image 20b to the image side by a distance indicated by the step-in length Y3. With the above-described operation, a printed product without a margin on any of the four sides can be obtained concerning each of the first image 20b and the second image 20a.

The process from print data reception to printed product discharge according to this embodiment will be described next with reference to the flowchart of FIGS. 6A and 6B. In step S100, the inkjet printing apparatus 100 receives an instruction of first printing (for example, printing of the first image 20b) in which marginless printing or bordered printing is set by the printer driver 210. In step S101, the main control unit 410 determines the presence/absence of necessity of trimming cut in accordance with the marginless printing or bordered printing setting of the first printing. That is, the main control unit 410 determines whether to perform trimming cut control of adding a margin to the leading edge of the image and cutting the continuous sheet 1 including the margin and a portion including the leading edge of the image when executing marginless printing. Note that this determination may be done by the print mode setting unit 220 in the printer driver 210. Upon determining in step S101 that bordered printing is set, and leading edge trimming cut is unnecessary, in step S102, the main control unit 410 determines whether the image length is shorter than the minimum cut length Lc. If the image length is equal to or more than the minimum cut length Lc in step S102, in step S103, the conveyance control unit 420 and the image formation control unit 430 start an appropriate printing operation of bordered printing based on an instruction from the main control unit 410. After completion of the printing operation, the inkjet printing apparatus 100 ends the printing operation in step S128.

If the image length is shorter than the minimum cut length Lc in step S102, in step S104, the main control unit 410 decides to add a margin of a length (for example, the trailing edge margin length Ln) obtained by subtracting the image length from the minimum cut length to the trailing edge of the image. That is, the main control unit 410 determines whether to perform minimum cut control of adding a margin to at least the trailing edge of the image and cutting the continuous sheet 1 when the image is shorter than a predetermined image length. In step S105, to start an appropriate printing operation of bordered printing, the image formation control unit 430 starts printing from a predetermined position. In step S106, the image formation control unit 430 ends the printing at a predetermined position. In step S107, to make the printed product have a length equal to or more than the minimum cut length, the conveyance control unit 420 feeds the continuous sheet 1 by a length corresponding to the image and the additional margin decided in step S104.

Upon determining in step S101 that marginless printing is set, and leading edge trimming cut is necessary, in step S108, the main control unit 410 determines whether the image length is shorter than the minimum cut length Lc. If the image length is equal to or more than the minimum cut length Lc in step S108, in step S109, the conveyance control unit 420 and the image formation control unit 430 start an appropriate printing operation of the above-described marginless printing. After completion of the printing operation, the inkjet printing apparatus 100 ends the printing operation in step S128.

If the image length is shorter than the minimum cut length Lc in step S108, in step S110, the main control unit 410 decides to add a margin (for example, the trailing edge margin 32) of a length obtained by subtracting the image length from the minimum cut length to the trailing edge of the image. That is, the main control unit 410 determines whether to perform minimum cut control of adding a margin to at least the trailing edge of the image and cutting the continuous sheet 1 when the image is shorter than a predetermined image length. In step S111, the conveyance control unit 420 feeds the continuous sheet 1 by a length (for example, the leading edge fed portion length Lp) necessary for leading edge trimming cut. In step S112, when the leading edge trimming cut length is ensured, the image formation control unit 430 starts printing from a predetermined position.

In step S113, when the leading edge trimming cut position (for example, the cutting position C5) reaches the cutter position during printing, the conveyance control unit 420 and the image formation control unit 430 temporarily stop printing and perform leading edge trimming cut. An image without a margin at the leading edge is formed on the continuous sheet 1. In step S114, the conveyance control unit 420 and the image formation control unit 430 continue the printing. In step S115, the conveyance control unit 420 and the image formation control unit 430 end the first printing at a predetermined position. In step S116, to make the printed product have a length equal to or more than the minimum cut length, the conveyance control unit 420 feeds the continuous sheet 1 by a length corresponding to the image and the additional margin decided in step S110.

Next, an instruction of second printing (for example, printing of the second image 20a) is received. The printer driver 210 sets marginless printing or bordered printing. In step S117, the main control unit 410 determines the presence/absence of necessity of trimming cut. That is, the main control unit 410 determines whether to perform trimming cut control of adding a margin to the leading edge of the image and cutting the continuous sheet 1 including the margin and a portion including the leading edge of the image when executing marginless printing. Upon determining in step S117 that bordered printing is set, and leading edge trimming cut is unnecessary, in step S118, the conveyance control unit 420 and the image formation control unit 430 cut the continuous sheet 1. In step S119, the conveyance control unit 420 and the image formation control unit 430 start an appropriate printing operation of bordered printing of the second printing based on an instruction from the main control unit 410. After completion of the printing operation, the inkjet printing apparatus 100 ends the printing operation in step S128.

If it is determined in step S117 that marginless printing is set, and leading edge trimming cut is necessary, and it has already been determined that the image length of the first printing instruction is shorter than the minimum cut length Lc, in step S120, the conveyance control unit 420 stops feeding of the continuous sheet 1 for leading edge trimming cut. That is, if the image of the first printing is shorter than a predetermined image length, and marginless printing is to be executed as the second printing to be executed next to the first printing, it is determined to apply minimum cut control to the first printing and not to apply trimming cut control to the second printing. In step S121, the main control unit 410 determines whether the image length of the instruction of the second printing is shorter than the minimum cut length Lc. If the image length is equal to or more than the minimum cut length Lc in step S121, in step S122, the conveyance control unit 420 and the image formation control unit 430 start printing from a predetermined position. In step S123, when the cutting position (for example, the cutting position C6) of the trailing edge of the first printing reaches the cutter position during printing, the conveyance control unit 420 and the image formation control unit 430 temporarily stop printing and cut the continuous sheet 1.

This cutting of the continuous sheet 1 also serves as leading edge trimming cut of the second printing, and an image without a margin at the leading edge is formed on the continuous sheet 1. That is, a printed product obtained by the instruction of the first printing includes the trailing edge margin and a portion including the leading edge of the second printing. In step S124, the conveyance control unit 420 and the image formation control unit 430 continue the printing. In step S125, the conveyance control unit 420 and the image formation control unit 430 end the printing at a predetermined position. In step S126, the conveyance control unit 420 feeds the continuous sheet 1 that has undergone the printing and conveys the cutting position (for example, the cutting position C7) at the trailing edge of the image to the cutter position. In step S127, the conveyance control unit 420 cuts the continuous sheet 1 while leaving a partial image on the continuous sheet 1, thereby forming an image without a margin at the trailing edge. In step S128, the conveyance control unit 420 and the image formation control unit 430 end the series of printing operations based on an instruction from the main control unit 410.

If the image length is shorter than the minimum cut length Lc in step S121, in step S129, the main control unit 410 decides to add a margin of a length obtained by subtracting the image length from the minimum cut length to the trailing edge of the image. That is, the main control unit 410 determines whether to perform minimum cut control of adding a margin to at least the trailing edge of the image and cutting the continuous sheet 1 when the image is shorter than a predetermined image length. In step S130, the conveyance control unit 420 and the image formation control unit 430 start printing from a predetermined position. In step S131, when the cutting position of the trailing edge of the first printing reaches the cutter position during printing, the conveyance control unit 420 and the image formation control unit 430 temporarily stop printing and cut the continuous sheet 1. This cutting of the continuous sheet 1 also serves as leading edge trimming cut of the second printing, and an image without a margin at the leading edge is formed on the continuous sheet 1. That is, a printed product obtained by the instruction of the first printing includes the trailing edge margin and a portion including the leading edge of the second printing. In step S132, the conveyance control unit 420 and the image formation control unit 430 continue the printing. In step S133, the conveyance control unit 420 and the image formation control unit 430 end the printing at a predetermined position. In step S134, to make the printed product have a length equal to or more than the minimum cut length, the conveyance control unit 420 feeds the continuous sheet 1 by a length corresponding to the image and the additional margin decided in step S129. In step S135, the conveyance control unit 420 cuts the continuous sheet 1. In step S128, the inkjet printing apparatus 100 ends the printing operation.

As described above, according to this embodiment, when performing marginless printing of a length shorter than the minimum cut length and then performing marginless printing of a length longer than the minimum cut length, a margin added to the trailing edge to meet the minimum cut length serves as a leading edge fed portion for leading edge trimming cut. With this processing, margins that are conventionally individually generated for leading edge trimming cut are integrated into the trailing edge margin to meet the minimum cut length, and wasteful consumption of continuous sheet can be reduced. In addition, the cut continuous sheet can correctly be discharged.

Wasteful consumption of continuous sheet can further be reduced by cutting the continuous sheet including the margin added to the trailing edge of the first image and a portion including the leading edge of the second image following the margin. When the predetermined image length used to determine application of minimum cut control is set to a length with which the cutter 5 can cut the continuous sheet 1 or a length from the position of the cutter 5 to the outer periphery of the apparatus housing, jamming of the continuous sheet into the apparatus or incomplete cutting can be prevented. The length from the position of the cutter 5 to the outer periphery of the apparatus housing is the length with which the cut continuous sheet can be discharged to the outside of the printing apparatus. Additionally, when the predetermined image length used to determine application of minimum cut control is set to the minimum image length stored in the storage unit of the computer 200, a minimum cut length according to, for example, the printer driver can be set. Furthermore, when a margin to be added to the image in minimum cut control (first control) is divisionally added to both the leading edge and the trailing edge of the image, the margins can be arranged in balance on the cut continuous sheet.

Note that in the above embodiment, a form in which if the image length is shorter than the minimum cut length, a margin is added to the trailing edge of the image has been described. However, the margin may divisionally be added to both the leading edge and the trailing edge of the image. In this embodiment, an inkjet printing apparatus has been exemplified. However, a printing apparatus constituted not by the inkjet method but by the electrophotographic method or electrostatic printing method is also usable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-013529, filed Jan. 27, 2015, which is hereby incorporated by reference herein in its entirety.

What is claimed is:
1. A printing apparatus comprising:
  a conveying unit configured to convey a continuous sheet in a conveyance direction;
  a printing unit configured to print an image on the continuous sheet;
  a cutting unit configured to cut the continuous sheet at a location of a leading edge side and a trailing edge side of the image printed on the continuous sheet; and
  a control unit configured to, when an image whose length in the conveyance direction is less than a predetermined length is printed, perform control of adding a margin portion on the trailing edge side of the image such that a length from a cutting position on the leading edge side of the image to a cutting position on the trailing edge side becomes more than the predetermined length,
  wherein in a case in which a marginless image is to be printed, if the margin portion is added on the trailing edge side of an image before the marginless image, the control unit performs control of printing the marginless image next to the margin portion, and if the margin portion is not added on the trailing edge side of the image before the marginless image, the control unit performs control of providing a margin portion of more than the predetermined length before the marginless image.

2. The apparatus according to claim 1, wherein the cutting unit cuts the continuous sheet including at least the margin portion and the leading edge of the marginless image following the margin portion.

3. The apparatus according to claim 1, wherein the predetermined length is one of a length with which the cutting unit is able to cut the continuous sheet and a length from the cutting position of the cutting unit to an outer periphery of a housing of the printing apparatus.

4. The apparatus according to claim 1, wherein the predetermined length is a minimum image length stored in a storage unit of an external apparatus.

5. The apparatus according to claim 1, wherein the margin portion is further provided at the leading edge of the image.

6. A control method of a printing apparatus including:
a conveying unit configured to convey a continuous sheet in a conveyance direction;
a printing unit configured to print an image on the continuous sheet;
a cutting unit configured to cut the continuous sheet at a location of a leading edge side and a trailing edge side of the image printed on the continuous sheet; and
a control unit configured to, when an image whose length in the conveyance direction is less than a predetermined length is printed, perform control of adding a margin portion on the trailing edge side of the image such that a length from a cutting position on the leading edge side of the image to a cutting position on the trailing edge side becomes more than the predetermined length, the method comprising:
in a case in which a marginless image is to be printed, if the margin portion is added on the trailing edge side of an image before the marginless image, causing the control unit to print the marginless image next to the margin portion; and
if the margin portion is not added on the trailing edge side of the image before the marginless image, causing the control unit to provide a margin portion of more than the predetermined length before the marginless image.

7. The method according to claim 6, further comprising causing the cutting unit to cut the continuous sheet including at least the margin portion and the leading edge of the marginless image following the margin portion.

8. The method according to claim 6, wherein the predetermined length is one of a length with which the cutting unit is able to cut the continuous sheet and a length from the cutting position of the cutting unit to an outer periphery of a housing of the printing apparatus.

9. The method according to claim 6, wherein the predetermined length is a minimum image length stored in a storage unit of an external apparatus.

10. The method according to claim 6, wherein the margin portion is further provided at the leading edge of the image.

11. A non-transitory storage medium storing a program for causing a computer of a printing apparatus including: a conveying unit configured to convey a continuous sheet in a conveyance direction; a printing unit configured to print an image on the continuous sheet; a cutting unit configured to cut the continuous sheet at a location of a leading edge side and a trailing edge side of the image printed on the continuous sheet; and a control unit configured to, when an image whose length in the conveyance direction is less than a predetermined length is printed, perform control of adding a margin portion on the trailing edge side of the image such that a length from a cutting position on the leading edge side of the image to a cutting position on the trailing edge side becomes more than the predetermined length, the program comprising:
in a case in which a marginless image is to be printed, if the margin portion is added on the trailing edge side of an image before the marginless image, causing the control unit to print the marginless image next to the margin portion; and
if the margin portion is not added on the trailing edge side of the image before the marginless image, causing the control unit to provide a margin portion of more than the predetermined length before the marginless image.

* * * * *